United States Patent [19]
Rinker et al.

[11] Patent Number: 6,152,729
[45] Date of Patent: Nov. 28, 2000

[54] SPRAY COOLED FURNACE DISCHARGE ASSEMBLY

[75] Inventors: Franklin G. Rinker, Perrysburg; Deane A. Horne, Toledo; Daniel A. Molnar, Perrysburg, all of Ohio; Thomas J. Sack, Brandon, Fla.

[73] Assignee: Maumee Research & Engineering, Inc., Northwood, Ohio

[21] Appl. No.: 09/358,161

[22] Filed: Jul. 20, 1999

Related U.S. Application Data

[63] Continuation-in-part of application No. 08/919,399, Aug. 28, 1997, Pat. No. 5,924,861.

[51] Int. Cl.⁷ .................................. F27B 9/39; F27B 7/33
[52] U.S. Cl. ...................... 432/117; 432/139; 266/173; 414/158
[58] Field of Search .................................. 432/103, 116, 432/117, 118, 195, 139, 79; 266/173; 414/151, 158, 588

[56] References Cited

U.S. PATENT DOCUMENTS

| | | | |
|---|---|---|---|
| 3,933,313 | 1/1976 | Waite | 266/173 |
| 4,200,262 | 4/1980 | Evans et al. | 266/173 |
| 4,370,128 | 1/1983 | Chielens et al. | 432/116 |
| 4,430,057 | 2/1984 | Hoover et al. | 432/139 |
| 4,631,026 | 12/1986 | McKinney | 432/139 |
| 4,636,127 | 1/1987 | Olano et al. | 414/158 |
| 5,924,861 | 7/1999 | Rinker et al. | 432/117 |

*Primary Examiner*—Denise L. Ferensic
*Assistant Examiner*—Gregory A. Wilson

[57] ABSTRACT

A discharge assembly for removing material from a hearth in a rotary hearth furnace including a discharge auger and a coolant spray. The discharge auger is positioned above the hearth of the rotary hearth furnace and includes a central shaft having at least one helical flight affixed to the exterior of the central shaft and the hood is disposed above the discharge auger. The coolant spray cools the discharge auger.

23 Claims, 6 Drawing Sheets

SPRAY COOLED FURNACE DISCHARGE ASSEMBLY

RELATED APPLICATION

This application is a continuation-in-part of copending U.S. pat. application Ser. No. 08/919,399 filed Aug. 28, 1997 U.S. Pat. No. 5,924,861 entitled Furnace Discharge Assembly, incorporated herein by reference.

FIELD OF THE INVENTION

The present invention relates to a spray cooled furnace discharge assembly. More particularly, the present invention relates to a spray cooled furnace discharge assembly for a rotary hearth furnace (RHF) including a discharge auger and a cooling spray positioned adjacent the auger for cooling the discharge auger.

BACKGROUND OF THE INVENTION

Direct reduction of iron oxide and other metallic oxides may be conducted in rotary hearth furnaces (RHF) using pelletized or briquetted compacts containing a carbonaceous reductant and deposited upon a rotating hearth. Briefly, a RHF is a continuous reheating furnace generally having an annular inner wall circumscribed by a spaced annular outer wall. The space there between includes a circular rotating hearth. Burners may be installed in the inner and outer walls and in the roof. Gases from the furnace are permitted to vent through a flue located in the roof.

Compacts are usually loaded (dropped) onto the rotating hearth by a conveyor or chute. After the material is conveyed along the hearth path it is removed by a discharge auger. The discharge auger typically consists of a central shaft with solid helical metal flights attached thereto and projecting away from the central shaft. High temperatures and the presence of oxygen or one or more of sodium, sulfides, chlorides, fluorides, potassium, lead, zinc, tin, iron, nickel and chromium within the RHF oftentimes corrodes and erodes the auger and renders the auger ineffective. To lessen the effects of the high temperatures (1300–2300 degrees Fahrenheit)(704–1260 degrees Celsius), a cooling fluid is frequently passed through the auger. See U.S. Pat. Nos. 3,443,931 and 4,636,127, incorporated herein by reference. It is intended that with sufficient flow rate, the fluid cooling maintains the central shaft of the auger within acceptable metal material operating temperatures. However, it will be appreciated that cooling of the core of the auger has some effect on modulation of the flight tip temperature, the flight tip temperature is determined primarily by the environment temperature. Although some heat is conducted through the helical flight to the fluid cooled central shaft, the high radiation heat transfer from the furnace and the limited thermal conductivity of the helical flight often causes the tips of the helical flight to operate over the maximum desired operating temperature of the metal alloys forming the helical flight thereby leading to premature auger failure.

It will be appreciated that failure of the auger necessitates replacement of the auger and unwanted downtime, high maintenance and labor costs, and inefficient use of the furnace which, in turn, leads to higher unit costs. In view of the foregoing, it will be appreciated that there is a significant need for an improved furnace discharge assembly.

An object of the present invention is to provide an improved furnace discharge assembly. Another object of the present invention is to provide a furnace discharge assembly including a discharge auger capable of better withstanding the high operating temperatures of the furnace. Yet another object of the present invention is to provide a furnace discharge assembly including a discharge auger and an external coolant spray to maintain the metal alloy helical flights at an acceptable operating temperature for oxidation and wear resistance. Still another object of the present invention is to provide a furnace discharge assembly that is simple and economical to manufacture and/or operate.

SUMMARY OF THE INVENTION

Briefly, according to this invention there is provided a discharge assembly for removing material from a hearth in a rotary hearth furnace. The discharge assembly includes a discharge auger and a coolant spray. The coolant spray cools the discharge auger by virtue of both evaporative and convective heat removal means.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENT

Figure 1:
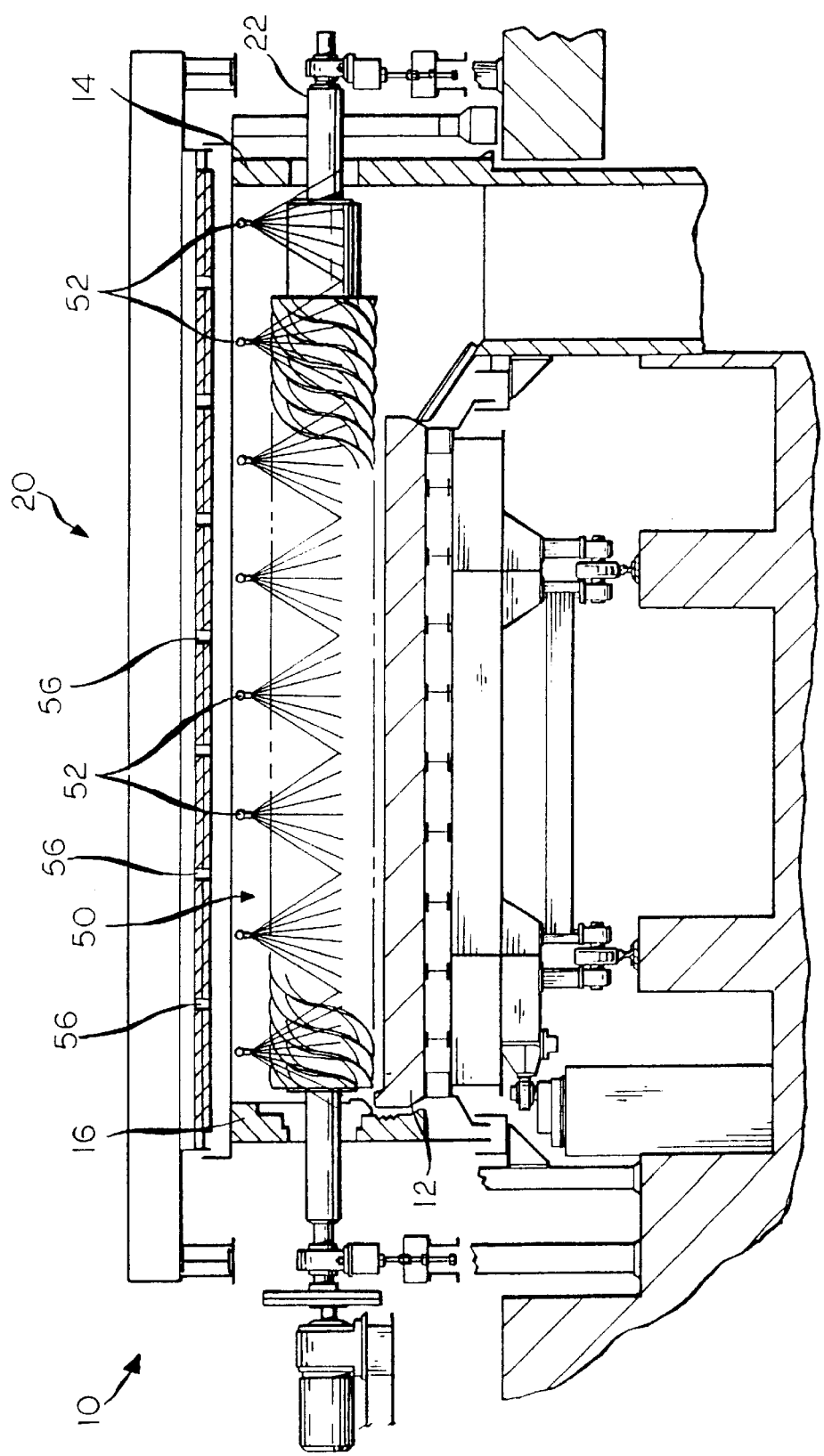
FIG. 1 is a partial sectional view of a furnace discharge assembly of a rotary hearth furnace including a discharge auger and a cooling spray.

In the following description, like reference characters designate like or corresponding parts. Referring to FIG. 1, a simplified cross-sectional view of a rotary hearth furnace (RHF) 10 is shown. In considering the RHF 10 shown in FIG. 1, it must be realized that the structure is schematic only and that certain details of construction are not provided for purposes of clarity. It will also be understood that these construction details are, once the invention is disclosed and explained well within the skill of the art.

As shown in FIG. 1, the RHF 10 includes a hearth 12, an annular refractory insulated outer wall 14 and a spaced annular refractory insulated inner wall 16. The hearth 12 is rotatably driven within the furnace by a motor operatively connected to a mechanical linkage as well known in the art. A plurality of burners (not shown) are positioned about the RHF 10. Material 18 is introduced onto the hearth 12 by a feeder mounted in the roof or through the outer wall (not shown) of the RHF 10 as well known in the art. After material processing is complete, typically, after almost one complete rotation of the hearth 12, the material is removed by a discharge assembly 20 through a discharge port for subsequent treatment.

As shown in FIG. 1, the discharge assembly 20 of the RHF 10 includes a discharge auger 22. The discharge auger 22 is positioned above the hearth and is mounted so as to operatively contact material on the hearth 12 to remove substantially all of the material from the hearth. The discharge auger 22 is mounted in a radial direction transverse to the path of the rotating hearth 12. In an alternate embodiment, the discharge auger 22 may be mounted at an angle skewed from radial to serve as a combination auger and plow for easier material removal from the rotating hearth.

The discharge auger 22 includes a central shaft 28 (FIG. 4) supported by two supporting end shafts 30 and 32 attached thereto. The central shaft 28 of the discharge auger 22 includes at least one helical flight 34. The helical flight 34 of the discharge auger 22 circumscribes the central shaft 28 and projects radially outward from the central shaft. Each flight 34 extends from about 1–12 inches, preferably 6 inches, radially outward from the central shaft 28 and is about 0.75–1.5 inches thick. The central shaft 28 may be insulated between flights to reduce heat loss as well known in the art.

Figure 4:
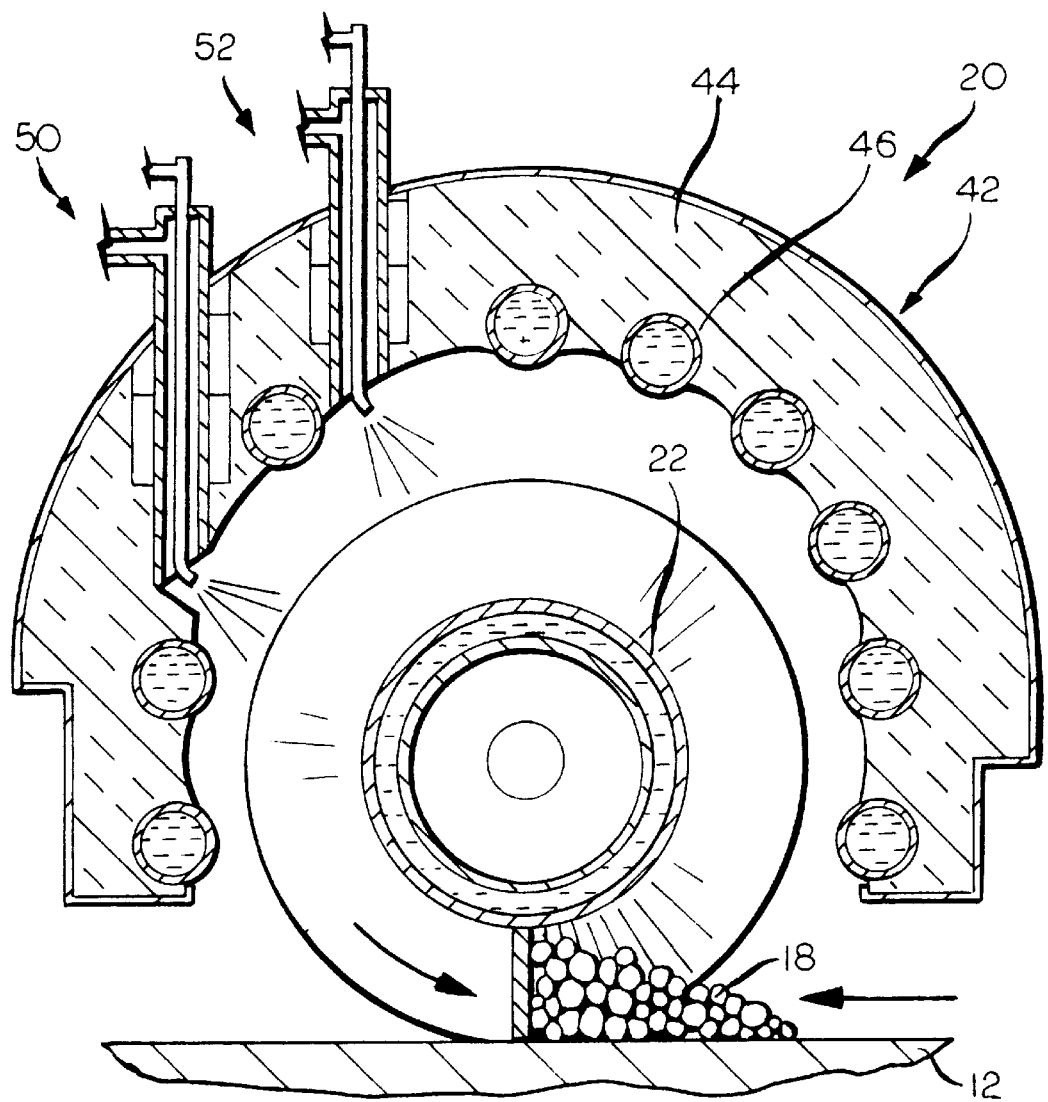
FIG. 4 is an enlarged partial view of a cross-section of a helical flight of a discharge auger.
Figure 5:
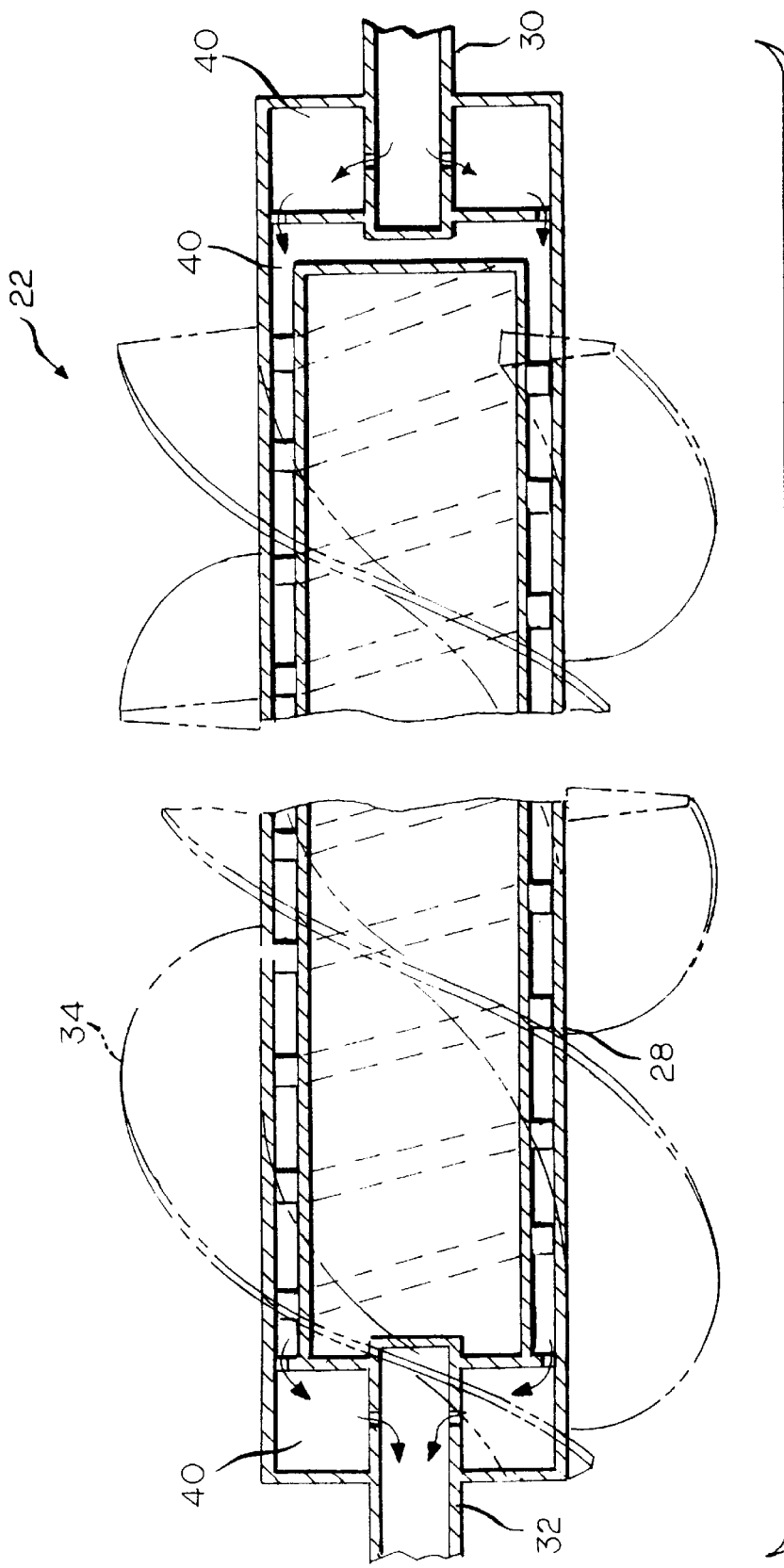
FIG. 5 is a sectional view of a discharge auger.
Figure 6:
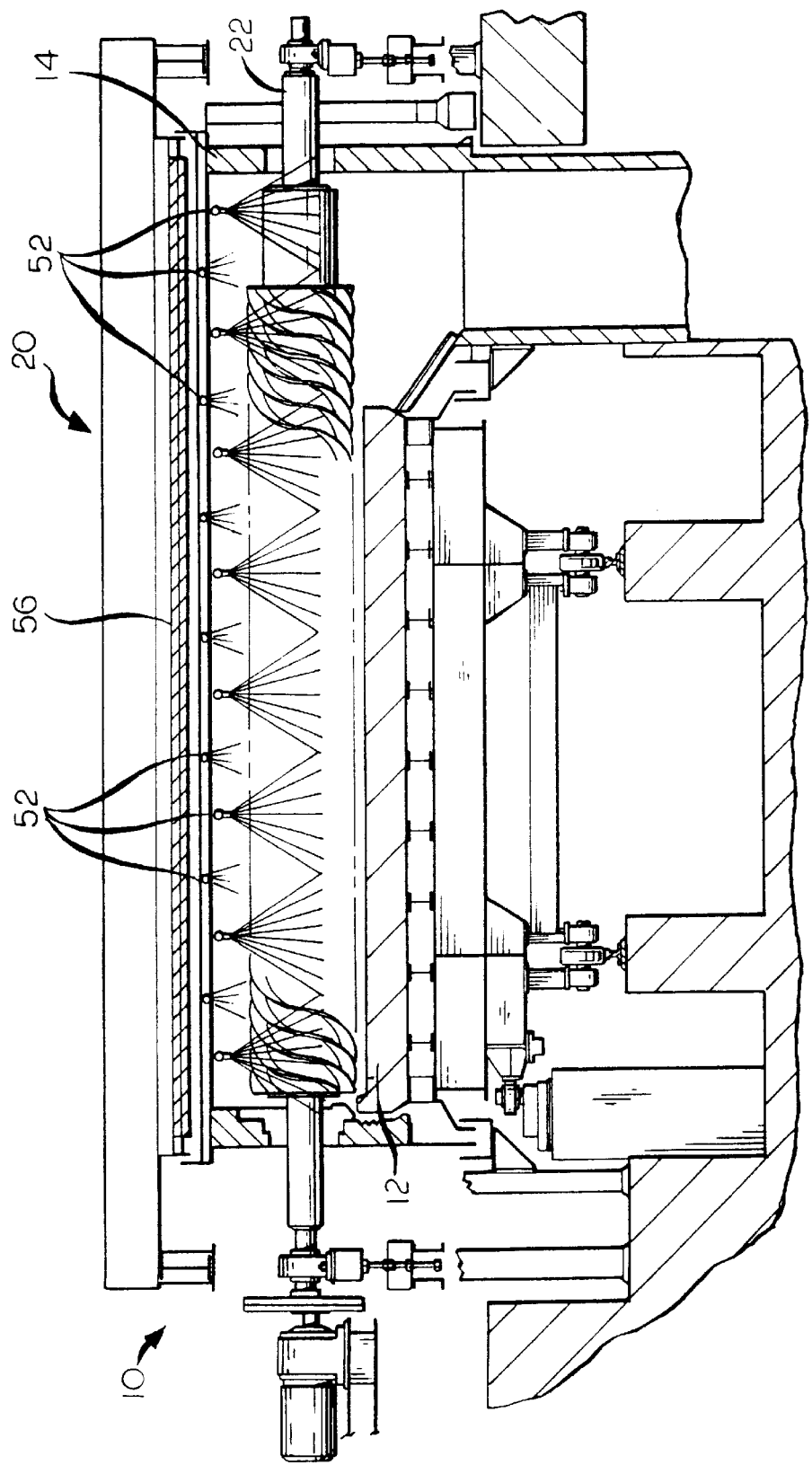
FIG. 6 is a partial view of a furnace discharge assembly of a rotary hearth furnace including a discharge auger and multiple rows of spray nozzles.

As shown in FIG. 4, an annular fluid passage 40 may be formed within the central shaft 28 of the discharge auger 22 and within each attached supporting shaft 30 and 32 to provide fluid communication throughout the longitudinal extent of the discharge auger as well known in the art. A fluid coolant may be supplied through the fluid passage 40 within the central shaft 28 and is discharged out through the support shaft 32. The fluid coolant may be most any suitable fluid well known in the art such as water and the like. It will be appreciated that depending upon the operating environment, the central shaft 28 of the discharge auger 22 may also be formed solid.

Referring to the helical flight 34, the helical flight may be formed as a solid member or the flight may be formed as a hollow member to permit cooling fluid to flow there through as well known in the art. The surfaces of the helical flight 34 may also include a wear resistant deposit suitable for high temperature applications. For example, the surfaces of the helical flight 34 may include a high hardness cobalt-chromium deposit such as that commercially available under the name Stellite 12-M. a cobalt alloy from Stoody. For a more detailed discussion of coolant flow to a helical flight reference is made to U.S. Pat. No. 4,636,127, incorporated herein by reference.

The helical flight 34 as shown is depicted in a clockwise right hand spiral. Accordingly, the discharge auger 22 as shown will rotate in a clockwise direction to remove material from the hearth 12. Each helical flight 34 of the auger 22 may be welded to the outer surface of the central shaft 28 or the helical flights may be integrally cast with the central shaft of the auger.

The discharge auger 22 and/or helical flight 34 may be made of most any suitable material. Suitable materials include heat-resistant stainless steels, chrome based alloys or metal composites, and heat-resistant metals including tungsten carbide and the like. An additional suitable material is a super alloy such as sold under the name Supertherm, a material having a high carbon and high silicon content commercially available from Electroalloys Corporation of Elyria, Ohio, USA. For a more detailed description of heat-resistant metals reference is made to Table 23-13 of Chemical Engineers Handbook, 7th Edition, McGraw Hill, N.Y.

It will be appreciated that a suitable chrome-based alloy exhibits optimum wear resistance at 1200 degrees Fahrenheit. Accordingly, some form of direct contact evaporative or convective cooling is required to achieve a discharge auger flight temperature in the 1200 degree Fahrenheit range when operating in a 2200 degree Fahrenheit environment. Moreover, Supertherm alloy includes the addition of cobalt to achieve high temperature oxidation and wear resistance. Optimum wear resistance is exhibited at temperatures between 1200–1600 degrees Fahrenheit. Accordingly, some form of evaporative or convective cooling is required to achieve a discharge auger flight temperature of less than 1600 degrees Fahrenheit when the auger is operating in a 2200 degree Fahrenheit temperature environment. Furthermore, a typical metal matrix with tungsten carbide added for wear resistance will be suitable for operation with auger flight tip temperatures up to 1650 degrees Fahrenheit. As in other metal auger flight designs, either evaporative or convection cooling is necessary to achieve satisfactory performance.

The helical flight 34 of the discharge auger 22 receives heat from both the operating furnace 10 and the material 18 conveyed on the furnace hearth 12. The insulation typically applied over the central shaft 28 limits radiation heat loss to the central shaft. Notwithstanding the presence of the insulation material, the high radiation heat flow from the operating furnace 10 and the limited thermal conductivity of the alloy metal forming the flight 34, the tips of the flight will often times operate over the maximum allowable operating temperature of the alloy metal. This causes limited life of the auger 22 and requires frequent replacement of the auger flights.

Figure 2:
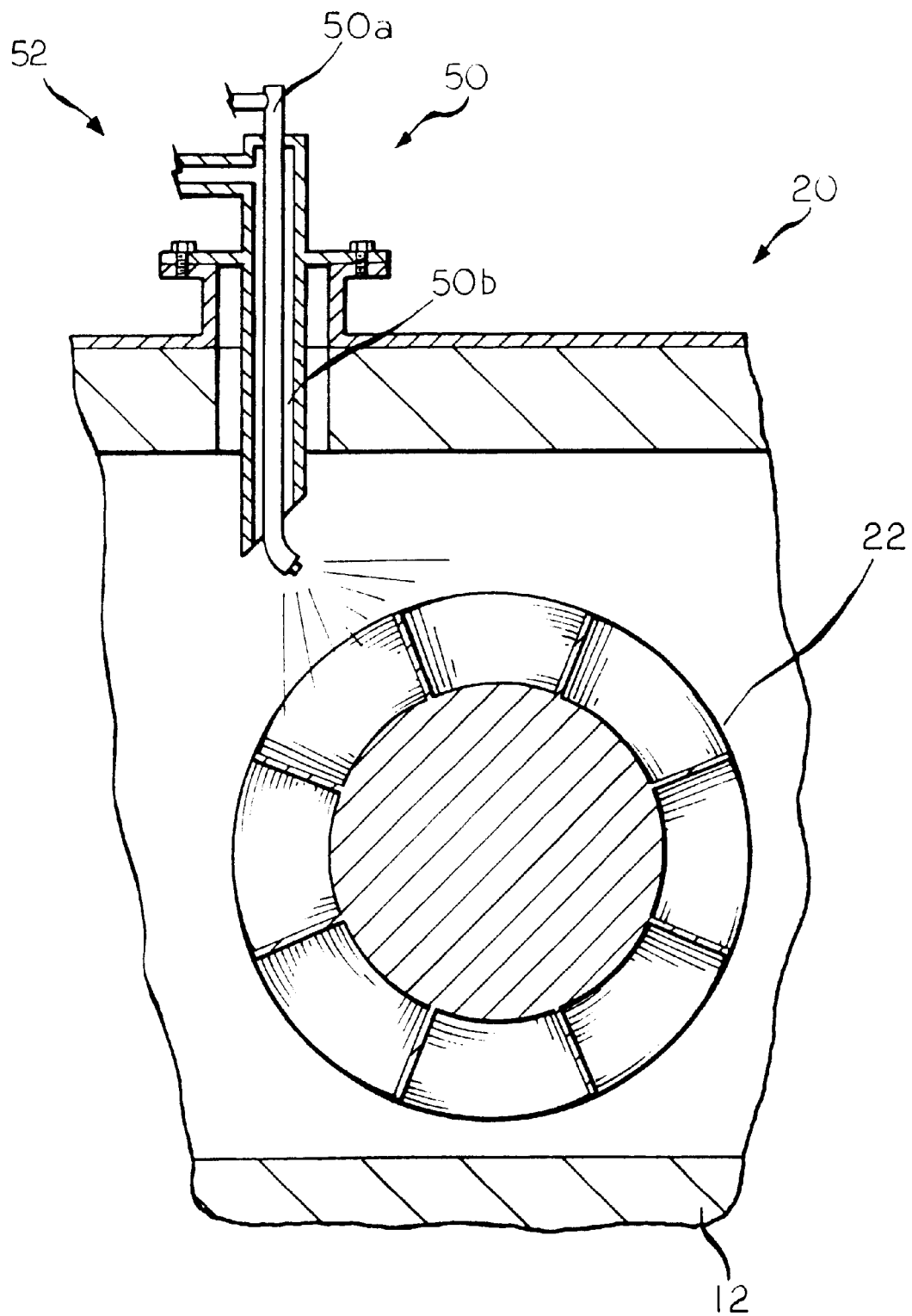
FIG. 2 is an enlarged sectional view of the auger of FIG. 1 showing a cooling spray.
Figure 3:
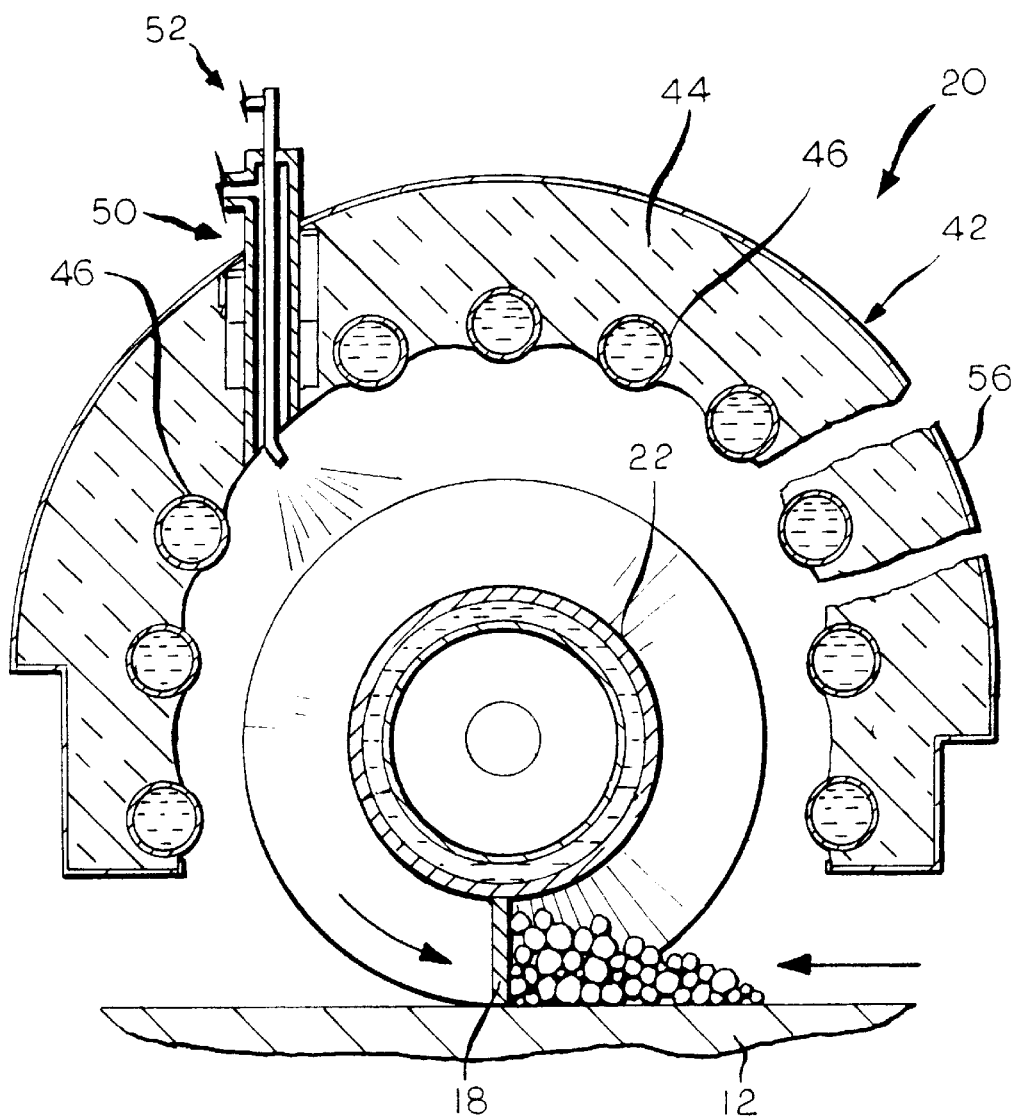
FIG. 3 is a sectional view of a furnace discharge assembly of a rotary hearth furnace including a cooling hood, a cooling spray and a discharge auger.

The discharge auger 22 may be positioned below a hood 42 as shown in FIG. 3 or the discharge auger may be positioned within the furnace without a hood FIGS. 1 and 2. As shown in FIG. 3, the hood 42 includes an insulated cover 44 and a coolant sink 46. The coolant sink 46 may be attached to the interior surface of the cover or incorporated within the hood structure. The coolant sink 46 may include a fluid filled tube formed in a serpentine pattern along the interior of the cover. A first end of the tube is operably connected to a suitable fluid coolant source and an opposing second end is operably connected to a reservoir wherein the fluid coolant is collected or subsequently disposed of. The fluid coolant flows through the tube in a continuous manner from end to end along the serpentine tube pattern. The cover 44 and coolant sink 46 are of a size and shape to maximize the area of exposure of the tube to the helical flight 34 and reduce the exposure of the discharge auger 22 to the extreme temperatures of the operating furnace. For a more detailed description of a fluid cooled hood reference is made to U.S. patent application Ser. No. 08/919,399 entitled Furnace Discharge Assembly, incorporated herein by reference.

As shown in FIGS. 1–3, in accordance with the present invention an external coolant spray 50 is employed to cool the discharge auger. In a preferred embodiment, the coolant spray 50 includes multiple rows of juxtaposed spray nozzles 52. The spray nozzles 52 are positioned so as to direct coolant spray upon the flight 34 and avoid directly impinging the coolant spray upon the central shaft 28 of the auger. As shown in FIG. 1, the coolant spray 50 may be directed vertically downward upon the flight or the coolant spray may be angled to contact the flight (FIGS. 2 and 3).

In one embodiment, the coolant spray 50 combines small particles of a liquid coolant 50a into a dispersing stream of gas 50b (FIG. 2). The liquid coolant 50a may be water and the like and the dispersing gas 50b may be most any suitable gas.

In a preferred embodiment, the dispersing gas is either an inert gas or a reducing gas at the operating temperature of the furnace 10. A suitable inert gas is nitrogen and suitable reducing gases include hydrogen or methane and the like. At the operating temperature of the furnace, the reducing gas drives the auger atmosphere equilibrium toward an atmosphere rich in hydrogen thereby forming a reducing atmosphere. The hydrogen in the auger atmosphere prevents water vapor that is present in the auger atmosphere when the coolant spray 50 is water from oxidizing the material on the hearth, e.g., directly reduced iron, that is subsequently discharged by the discharge auger.

The spray nozzles 52 for spraying the liquid coolant 50a and the gas 50b may be most any suitable atomizing nozzle of a design well known in the art. For a more detailed description of a suitable atomizing spray nozzle reference is made to U.S. Pat. No. 5,732,885, incorporated herein by reference.

In an alternate embodiment, the liquid coolant 50a may be water and the gas 50b may be any suitable gas well known in the atomization art other than a reducing gas. When using a gas other than a reducing gas in the reducing atmosphere of the furnace 10, the area above the hearth must be vented to prevent water vapor from contacting the material to be treated within the furnace. It will be appreciated that water vapor may adversely affect the reduction of the material within the rotary hearth furnace. The vents 56 are positioned along the upper surface of the hood 42 and vented externally of the rotary hearth furnace 10.

In yet another embodiment, the coolant spray 50 may include a gas stream 50b of reduced temperature furnace gas. The reduced temperature furnace gas may be obtained by extracting the furnace gas from the auger chamber, cooling the furnace gas in a water scrubber, passing the furnace gas through a recirculating fan and injecting the cooled furnace gas back into the auger chamber.

The patents and documents identified herein are hereby incorporated by reference.

Having described presently preferred embodiments of the invention, it is to be understood that it may be otherwise embodied within the scope of the appended claims.

What is claimed is:

1. A discharge assembly for removing material from a hearth in a rotary hearth furnace comprising in combination:
    a discharge auger positioned above the hearth of the rotary hearth furnace, the discharge auger including a central shaft having at least one helical flight affixed to the exterior of the central shaft; and
    a coolant spray to cool the discharge auger.
2. The discharge assembly of claim 1 wherein the coolant spray includes multiple rows of juxtaposed spray nozzles.
3. The discharge assembly of claim 2 wherein the spray nozzles are positioned so as to direct coolant spray upon the flight and avoid directly impinging the coolant spray upon the central shaft of the auger.
4. The discharge assembly of claim 3 wherein the coolant spray is directed vertically downward upon the flight.
5. The discharge assembly of claim 3 wherein the coolant spray is angled to contact the flight.
6. The discharge assembly of claim 1 wherein the coolant spray is a combination of small particles of a liquid coolant in a carrier stream of gas.
7. The discharge assembly of claim 6 wherein the liquid coolant is water and the gas is selected from the group consisting of nitrogen, hydrogen and methane.
8. The discharge assembly of claim 6 wherein the liquid coolant is water and the gas is other than a reducing gas.
9. The discharge assembly of claim 6 wherein the coolant spray includes a stream of reduced temperature furnace gas.
10. The discharge assembly of claim 1 further comprising a hood disposed above the discharge auger.
11. The discharge assembly of claim 10 wherein the coolant spray includes multiple rows of juxtaposed spray nozzles.
12. The discharge assembly of claim 11 wherein the spray nozzles are positioned so as to direct coolant spray upon the flight and avoid directly impinging the coolant spray upon the central shaft of the auger.
13. The discharge assembly of claim 12 wherein the coolant spray is directed vertically downward upon the flight.
14. The discharge assembly of claim 13 wherein the coolant spray is angled to contact the flight.
15. The discharge assembly of claim 10 wherein the coolant spray is a combination of small particles of a liquid coolant in a carrier stream of gas.
16. The discharge assembly of claim 10 wherein the liquid coolant is water and the gas is selected from the group consisting of nitrogen, hydrogen and methane.
17. The discharge assembly of claim 10 wherein the liquid coolant is water and the gas is other than a reducing gas.
18. The discharge assembly of claim 10 wherein the area below the hood is vented to prevent water vapor from contacting the material to be treated within the furnace.
19. The discharge assembly of claim 18 wherein the vents are positioned along the upper surface of the hood and vented externally of the rotary hearth furnace.
20. The discharge assembly of claim 10 wherein the coolant spray includes a stream of reduced temperature furnace gas.
21. The discharge assembly of claim 20 wherein the reduced temperature furnace gas is obtained by extracting the furnace gas from the hood, cooling the furnace gas in a water scrubber, passing the furnace gas through a recirculating fan and injecting the cooled furnace gas back into the coolant spray.
22. The discharge assembly of claim 21 wherein the vents are positioned along the upper surface of the hood and vented externally of the rotary hearth furnace.
23. The discharge assembly of claim 22 wherein the reduced temperature furnace gas is obtained by extracting the furnace gas from the hood, cooling the furnace gas in a water scrubber, passing the furnace gas through a recirculating fan and injecting the cooled furnace gas back into the coolant spray.

* * * * *